US010014123B2

(12) United States Patent
Hannah et al.

(10) Patent No.: US 10,014,123 B2
(45) Date of Patent: Jul. 3, 2018

(54) OVERCOMING VARIANCE IN STACKED CAPACITORS

(71) Applicants: Eric C. Hannah, Pebble Beach, CA (US); Cary L. Pint, Hayward, CA (US); Charles W. Holzwarth, San Jose, CA (US); John L. Gustafson, Pleasanton, CA (US)

(72) Inventors: Eric C. Hannah, Pebble Beach, CA (US); Cary L. Pint, Hayward, CA (US); Charles W. Holzwarth, San Jose, CA (US); John L. Gustafson, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/065,631

(22) Filed: Mar. 9, 2016

(65) Prior Publication Data

US 2016/0329163 A1    Nov. 10, 2016

Related U.S. Application Data

(62) Division of application No. 13/995,140, filed as application No. PCT/US2011/064969 on Dec. 14, 2011, now Pat. No. 9,299,505.

(51) Int. Cl.
*H01G 11/12* (2013.01)
*H01G 11/24* (2013.01)
(Continued)

(52) U.S. Cl.
CPC .............. *H01G 11/24* (2013.01); *H01G 11/04* (2013.01); *H01G 11/08* (2013.01); *H01G 11/12* (2013.01);
(Continued)

(58) Field of Classification Search
CPC ........ H01G 11/08; H01G 11/24; H01G 11/04; H01G 4/005; H01G 4/30; H01G 11/56; H01G 4/12; H01G 9/028; H01G 9/045
See application file for complete search history.

(56) References Cited

U.S. PATENT DOCUMENTS 6,455,108 B1   9/2002   Muffoletto et al.
6,751,085 B1   6/2004   Huntington
(Continued)

FOREIGN PATENT DOCUMENTS

CN    1360728 A    7/2002
CN    1521288      8/2004
(Continued)

OTHER PUBLICATIONS

Notification of Transmittal of the International Search Report and the Written Opinion of the International Searching Authority, or the Declaration issued for International Patent Application PCT/US2011/064969, dated Sep. 17, 2012.
(Continued)

*Primary Examiner* — Nguyen Ha
(74) *Attorney, Agent, or Firm* — Womble Bond Dickinson (US) LLP

(57) ABSTRACT

In one embodiment of the invention, a method of forming an energy storage device is described in which a porous structure of an electrically conductive substrate is measured in-situ while being electrochemically etched in an electrochemical etching bath until a predetermined value is obtained, at which point the electrically conductive substrate may be removed from the electrochemical etching bath. In another embodiment, a method of forming an energy storage device is described in which an electrically conductive porous structure is measured to determine the energy storage capacity of the electrically conductive porous structure. The energy storage capacity of the electrically conductive porous
(Continued)

structure is then reduced until a predetermined energy storage capacity value is obtained.

9 Claims, 11 Drawing Sheets

(51) Int. Cl.
    *H01G 11/14*     (2013.01)
    *H01G 11/84*     (2013.01)
    *H01G 13/00*     (2013.01)
    *H01G 11/04*     (2013.01)
    *H01G 11/08*     (2013.01)

(52) U.S. Cl.
    CPC ............. *H01G 11/14* (2013.01); *H01G 11/84* (2013.01); *H01G 13/00* (2013.01); *Y02E 60/13* (2013.01)

(56) References Cited

U.S. PATENT DOCUMENTS

| | | | |
|---|---|---|---|
| 6,862,184 B2* | 3/2005 | Shi | G06F 1/189 |
| | | | 174/16.3 |
| 7,255,924 B2* | 8/2007 | Long | C25D 13/12 |
| | | | 428/408 |
| 8,404,134 B2 | 3/2013 | Imanaka et al. | |
| 8,427,811 B2 | 4/2013 | Machida et al. | |
| 8,654,509 B2 | 2/2014 | Ishimoto et al. | |
| 9,025,313 B2 | 5/2015 | Hannah | |
| 2003/0049538 A1* | 3/2003 | Buerger | H01G 9/02 |
| | | | 429/249 |
| 2006/0021649 A1* | 2/2006 | Kuroda | H01G 9/2031 |
| | | | 136/263 |
| 2010/0200403 A1 | 8/2010 | Lopatin et al. | |
| 2010/0221606 A1* | 9/2010 | Nalamasu | C25D 11/32 |
| | | | 429/209 |
| 2011/0206992 A1* | 8/2011 | Campbell | H01M 4/80 |
| | | | 429/235 |
| 2014/0118884 A1* | 5/2014 | Lin | C04B 35/14 |
| | | | 361/502 |
| 2015/0002986 A1* | 1/2015 | Gardner | H01G 11/10 |
| | | | 361/502 |

FOREIGN PATENT DOCUMENTS

| | | |
|---|---|---|
| CN | 2636390 Y | 8/2004 |
| JP | 2005-142391 A | 6/2005 |
| WO | WO 2008/050120 A2 | 5/2008 |
| WO | WO 2011/123135 A1 | 10/2011 |
| WO | WO 2011123135 A1 | 10/2011 |

OTHER PUBLICATIONS

Desplobain, S., et al., "Investigations on porous silicon as electrode material in electrochemical capacitors," Physical Status Solidi, vol. 4, No. 6, pp. 2180-2184, May 2007.

Desplobain, et al., "Investigations on porous silicon as electrode material in electrochemical capacitors," Wiley InterScience, Phys. Stat. Sol.,4, No. 6, pp. 2180-2184, 2007.

PCT International Search Report and Written Opinion for International Application No. PCT/US2011/064969, dated Sep. 17, 2012, 9 pages.

* cited by examiner

OVERCOMING VARIANCE IN STACKED CAPACITORS

PRIORITY

This application is a divisional of and claims the benefit of U.S. patent application Ser. No. 13/995,140, titled "OVERCOMING VARIANCE IN STACKED CAPACITORS", filed Jun. 17, 2013, which is a U.S. National Phase application under 35 U.S.C. § 371 of International Application No. PCT/US2011/064969, filed Dec. 14, 2011, entitled OVERCOMING VARIANCE IN STACKED CAPACITORS, both of which are incorporated by reference in its entirety.

BACKGROUND

The disclosed embodiments of the invention relate generally to energy storage devices, and relate more particularly to methods of overcoming variance between capacitors.

Modern societies depend on the ready availability of energy. As the demand for energy increases, devices capable of efficiently storing energy become increasing important. As a result, energy storage devices, including batteries, capacitors, electrochemical capacitors (ECs), (including pseudocapacitors and electric double-layer capacitors (EDLCs)—also known as ultracapacitors, among other names), hybrid ECs, and the like are being extensively used in the electronics realm and beyond. In particular, capacitors are widely used for applications ranging from electrical circuitry and power delivery to voltage regulation and battery replacement. Electrochemical capacitors are characterized by high energy storage capacity as well as other desirable characteristics including high power density, small size, and low weight, and have thus become promising candidates for the use in several energy storage applications.

In a related application PCT/US2010/029821, published as WO 2011/123135, three-dimensional structures for forming high energy density electrochemical capacitors are disclosed. In some of the disclosed embodiments, a wet etching process is used to etch pores deep into a silicon structure and the pores are filled with an electrolyte or with a high-k dielectric material and/or a thin conductive film in combination with an electrolyte. Because an electrolyte is utilized, such an electrochemical capacitor may only be charged up to a few volts before electrochemical reactions break down the electrolyte, produce gas, and destroy the component.

BRIEF DESCRIPTION OF THE DRAWINGS

The disclosed embodiments will be better understood from a reading of the following detailed description, taken in conjunction with the accompanying figures in the drawings in which.

Figure 1:
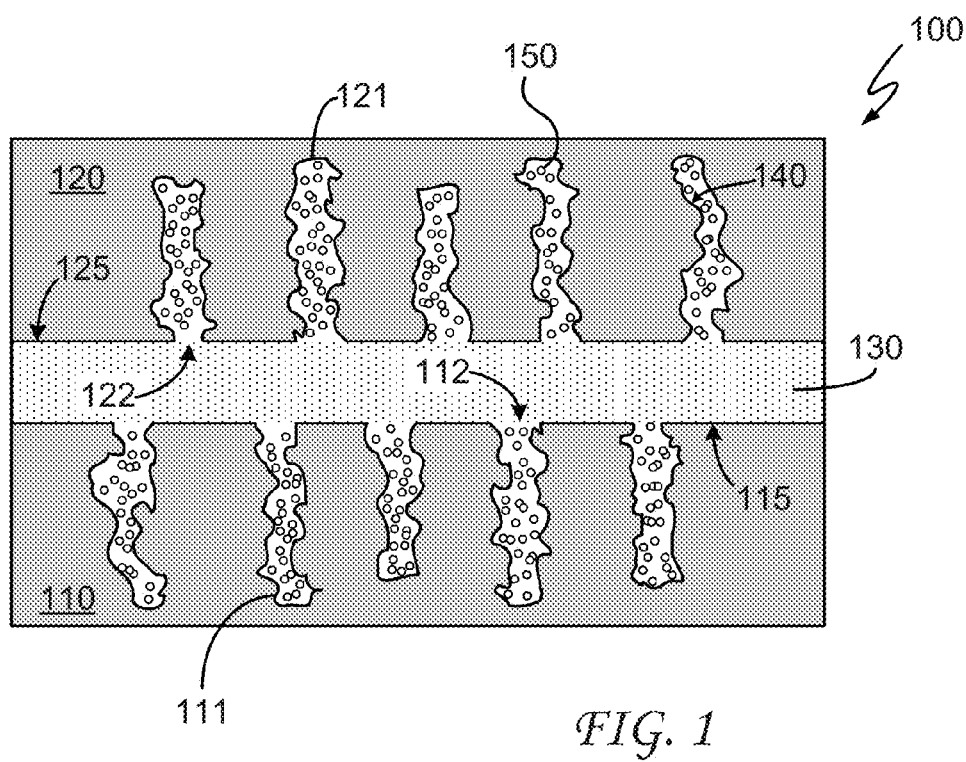
FIGS. 1-2 are cross-sectional side view illustrations of an energy storage device according to embodiments of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION

In one embodiment of the invention, a method of forming an energy storage device is described in which a porous structure of an electrically conductive substrate is measured in-situ while being electrochemically etched in an electrochemical etching bath until a predetermined value is obtained, at which point the electrically conductive substrate may be removed from the electrochemical etching bath. The porous structure forms in the electrically conductive substrate as the electrically conductive substrate is electrochemically etched, and the corresponding surface area and energy storage capacity of the porous structure may increase as a function of etching time. In this manner, the in-situ measurement is used as a feedback to terminate the electrochemical etching process at a specific point corresponding to a specific surface area that has been etched, and resultant energy storage capacity of the porous structure.

In another embodiment, a method of forming an energy storage device is described in which an electrically conductive porous structure is measured to determine the energy storage capacity of the electrically conductive porous structure. Based upon the measured value, the energy storage capacity of the electrically conductive porous structure is then reduced until a predetermined energy storage capacity value is obtained. For example, this may be accomplished by reducing the surface area of the electrically conductive porous structure by selective laser melting of a trim capacitor region, or electrically disconnecting a trim capacitor region from a bulk capacitor region. In this manner, an energy storage device can be initially fabricated with a certain range of energy storage capacity, and later fine-tuned to a more precise energy storage capacity value. Such a reduction technique may be employed to match the energy storage capacity value for multiple energy storage devices.

In one aspect, embodiments of the present invention provide methods and structures that may be employed to control the precise energy storage capacity in each plate (comprising an electrically conductive porous structure) of an energy storage device such as a porous silicon electrochemical capacitor. This may allow very tight matching of capacitors and thereby enable large numbers of electrochemical capacitors to be stacked in series for high operating voltage with minimal reduction in energy storage efficiency. In another aspect, embodiments of the present invention may significantly diminish the necessity for complicated biasing circuitry associated with stacking electrochemical capacitors in series.

Many silicon-based circuits need to run at input voltages in excess of 3 volts due to their bandgap energy, the need for a strong turn-on bias and the fact that most circuits stack several transistors to make push-pull circuits. Since many electrochemical capacitors incorporate electrolytes or ionic solutions which tend to break down at voltages in excess of 3 volts, such single electrochemical capacitors are not coupled with a silicon-based circuit due to power regulation. Multiple electrochemical capacitors are also not stacked in series in order to create an energy storage device that operates at n-times the working voltage of each electrochemical capacitor because current fabrication techniques typically result in electrochemical capacitors with +/−20% variance in their capacitance.

For example, consider two capacitors in series: C and $C(1-\in)$, where $\in$ varies from 0 to 1 and represents the peak to peak variation of the two capacitors. For example, if one capacitor is +20% above its specified value and the other capacitor is −20% below its specified value then $\in$ would be equal to 0.40. As current is applied to the stack equal amounts of current flow through each capacitor, causing a voltage rise in each capacitor. When the lowest capacitance reaches its maximum voltage (Vmax) application of the charging current must be stopped to avoid damage to that capacitor. The larger capacitor will remain below Vmax as it takes more charge to reach that voltage. The total energy stored in the energy storage device is the sum of terms $\frac{1}{2}CV^2$ for each capacitor. Working out the ratio of stored energy to the maximum possible two-capacitor stored value, the efficiency is:

$$\text{Efficiency}=\tfrac{1}{2}(2-3\in+\in^2)$$

Thus, the mismatched capacitors cannot store the maximum possible energy. In application, +/−20% variance in capacitance implies a worst case mismatch of 40%. This implies two capacitors only store ½ the ideal amount of energy, which is as much as only a single capacitor. Accordingly, stacking more than two electrochemical capacitors fabricated using currently available manufacturing methods and structures is impractical without complicated biasing circuitry.

Embodiments of the present invention provide methods and structures that may be employed to address variance between capacitors by controlling the precise energy storage capacity in each plate of an energy storage device such as a porous silicon electrochemical capacitor. In this manner, very tight matching of capacitors may be accomplished, enabling large numbers of electrochemical capacitors to be stacked in series for high operating voltage with minimal reduction in energy storage efficiency. In addition, the necessity for complicated biasing circuitry associated with stacking electrochemical capacitors in series may be significantly diminished in accordance with embodiments of the present invention.

Although much of the discussion herein will focus on electrochemical capacitors (including pseudocapacitors and electric double-layer capacitors), the "energy storage device" designation explicitly includes, in addition to ECs, hybrid ECs, as well as batteries, fuel cells, and similar devices that store energy. Energy storage devices according to embodiments of the invention can be used for a wide variety of applications, including in automobiles, buses, trains, airplanes, other transportation vehicles, home energy storage, storage for energy generated by solar or wind energy generators (especially energy harvesting devices), and many others.

Electrochemical capacitors operate according to principles similar to those that govern conventional parallel plate capacitors, but certain important differences do apply. One significant difference concerns the charge separation mechanism. For one important class of ECs this typically takes the form of a so-called electric double layer, or EDL, rather than of the dielectric of a conventional capacitor. The EDL is created by the electrochemical behavior of ions at an interface between a high-surface area electrode and an electrolyte, and results in an effective separation of charge in spite of the fact that the layers are so close together. (Physical separation distances are on the order of a single nanometer.) Thus, a typical EDL capacitor may be thought of as storing charge in its EDL. Each layer of the EDL is electrically conductive but the properties of the double layer prevent current from flowing across the boundary between them. (The EDL is further discussed below in connection with FIG. 4.)

As is true in conventional capacitors, capacitance in an electrochemical capacitor is proportional to the surface area of the electrodes and inversely proportional to the charge separation distance. The very high capacitances achievable in an electrochemical capacitor are due in part to the very high surface area attributable to the multi-channel porous structure and to the nanometer-scale charge separation distance attributable to the EDL, which arises due to the presence of an electrolyte, as explained above. One type of electrolyte that may be used in accordance with embodiments of the invention is an ionic solution (liquid or solid). Another is an electrolyte (e.g., $Li_2SO_4$, $LiPF_6$) comprising an ion-containing solvent. Organic electrolytes and solid-state electrolytes are also possible.

Another class of electrochemical capacitor is the pseudocapacitor, where instead of EDL capacitance a different kind of capacitance—one that is faradaic and not electrostatic in origin—can arise at certain types of electrodes. This different kind of capacitance is called "pseudocapacitance." Pseudocapacitors are energy storage devices that behave like capacitors but also exhibit reactions that result in charge storage. Typically, one of the electrodes of a pseudocapacitor is coated with a transition metal oxide such as $MnO_2$, $RuO_2$, $NiO_x$, $Nb_2O_5$, $V_2O_5$, etc., or with other materials including $Mo_2N$, $VN$, $W_2N$, $W_2C$ (tungsten carbide), $Mo_2C$, $VC$, a suitable conducting polymer, or a similar material. These materials can be used with an electrolyte such as potassium hydroxide (KOH); when the device is charged, the electrolyte will react with the material in a reaction that allows energy to be stored in a manner that has similarities to a battery's energy storage. More specifically, these materials store energy through highly-reversible surface and subsurface redox (faradic) reactions, but at the same time the electric double layer energy storage mechanism remains in place and provides the potential for high power.

Hybrid electrochemical capacitors are energy storage devices that combine the attributes of ECs and batteries. In one example, an electrode coated with a lithium ion material is combined with an electrochemical capacitor in order to create a device that has an EC's rapid charge and discharge characteristics and a battery's high energy density. On the other hand, hybrid ECs, like batteries, have shorter expected lifespans than do electrochemical capacitors.

Figure 2:
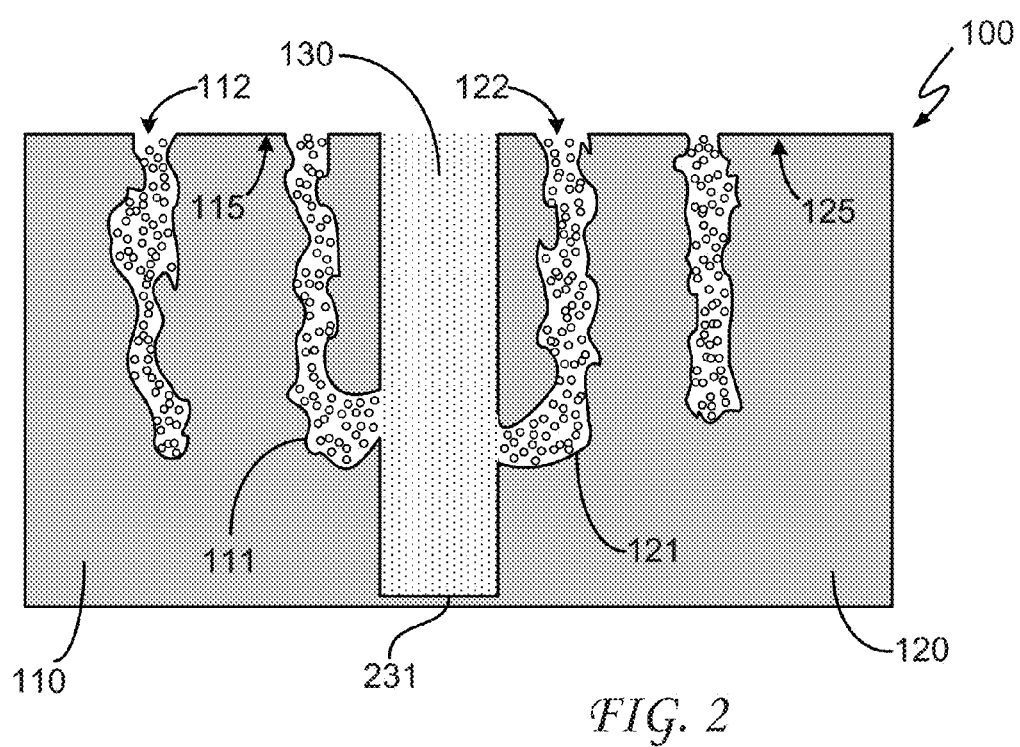

FIGS. 1-2 are cross-sectional views of an energy storage device 100 according to embodiments of the invention. As illustrated in FIGS. 1 and 2, energy storage device 100 comprises an electrically conductive structure 110 and an electrically conductive structure 120 separated from each other by a separator 130 that is an electrical insulator and an ionic conductor. Separator 130 prevents electrically conductive structures 110 and 120 from physically contacting each other so as to prevent an electrical short circuit. In other embodiments, a separator is not necessary and can be omitted.

At least one of electrically conductive structures 110 and 120 comprises a porous structure. In the embodiment illustrated in FIGS. 1-2, both of the electrically conductive structures comprise an electrically conductive porous structure. In accordance with some embodiments, the porous structure contains multiple channels, each one of which has an opening to a surface of the porous structure. This feature may be the result of an electrochemical etching process, described below, used to form the porous structure. As an example, the porous structure may be formed within an electrically conductive material such as a conductive material or semiconductive material. Alternatively, the porous structure may be formed within an insulating material (e.g. alumina) that has been coated with an electrically conductive film (e.g., an ALD conductive film such as titanium nitride (TiN)). In this regard, materials having greater electrical conductivity are advantageous because they lower the effective series resistance (ESR). In the illustrated embodiments both electrically conductive structure 110 and electrically conductive structure 120 comprise such a porous structure. Accordingly, electrically conductive structure 110 comprises channels 111 with openings 112 to a surface 115 of the corresponding porous structure and electrically conductive structure 120 comprises channels 121 with openings 122 to a surface 125 of the corresponding porous structure. In an embodiment where only one of electrically conductive structures 110 and 120 comprises a porous structure with multiple channels, the other electrically conductive structure can be, for example, a metal electrode or a polysilicon structure.

Various configurations of energy storage device 100 are possible. In the embodiment of FIG. 1, for example, energy storage device 100 comprises two distinct electrically conductive porous structures (that is, electrically conductive structure 110 and electrically conductive structure 120) that have been bonded together face-to-face with separator 130 in between. As another example, in the embodiment of FIG. 2 energy storage device 100 comprises a single planar electrically conductive porous structure in which a first section (electrically conductive structure 110) is separated from a second section (electrically conductive structure 120) by a trench 231 containing separator 130. One of the electrically conductive structures will be the positive side and the other electrically conductive structure will be the negative side. For example, separator 130 could be a permeable membrane or other porous polymer separator. In general, the separator prevents the physical contact of anode and cathode (which would cause an electrical malfunction in the device) while permitting the transfer of ionic charge carriers. In addition to polymer separators, several other separator types are possible. These include nonwoven fiber sheets, liquid membranes, polymer electrolytes, solid ion conductors, and the like.

FIG. 2 shows a small bridge of material connecting electrically conductive structure 110 and electrically conductive structure 120. If left unaddressed, this bridge may act as an electrical short between the two electrically conductive structures. There are several possible solutions, however. For example, the bridge may be removed using a polishing operation (and the conductive structure held apart by some other means). Alternatively, the electrically conductive structures may be formed in a heavily-doped top layer or region of a wafer while the trench extends down to an underlying lightly-doped substrate that is not a very good conductor. Or a silicon-on-insulator structure may be used.

As an example, the porous structure of electrically conductive structures 110 and 120 can be created by a wet etch process in which a liquid etchant applied to a surface of the electrically conductive structures etches away portions of the electrically conductive structure in a way that is at least somewhat similar to the way water is able to carve channels in rock. This is why each one of the channels has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels).

With the right etchant, it should be possible to make porous structures having the described characteristics from a wide variety of materials. In an embodiment, a porous silicon structure may be created by etching an electrically conductive silicon substrate with a mixture of hydrofluoric acid and ethanol in an electrochemical etching bath. However, embodiments of the invention are not limited to porous silicon structures, nor are embodiments of the invention limited to electrochemical etching. Electrochemical etching is described herein as one method of forming a porous structure in an electrically conductive structure in which the porous structure can be measured in-situ in order to determine when to terminate the etching process corresponding to a specific surface area and resultant energy storage capacity of the porous structure.

Besides porous silicon, some other materials that may be especially well-suited for energy storage devices according to embodiments of the invention are porous germanium and porous tin. Possible advantages of using porous silicon include its compatibility with existing silicon technology. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge—which is an undesirable result—especially where the silicon porosity is greater than about 20 percent.) Porous germanium is also highly compatible with silicon technology. Possible advantages of using porous tin, which is a zero-band-gap material, include its enhanced conductivity with respect to certain other conductive and semiconductive materials. Other materials may also be used for the porous structure, including silicon carbide, alloys such as an alloy of silicon and germanium, and metals such as copper, aluminum, nickel, calcium, tungsten, molybdenum, and manganese.

It should also be noted that the depictions of the porous structures in FIGS. 1-2 are highly idealized in that, to mention just one example, all of channels 111 and 121 are shown as only extending vertically. In reality the channels would branch off in multiple directions to create a tangled, disorderly pattern that may look something like the porous structure shown in FIG. 3.

Figure 3:
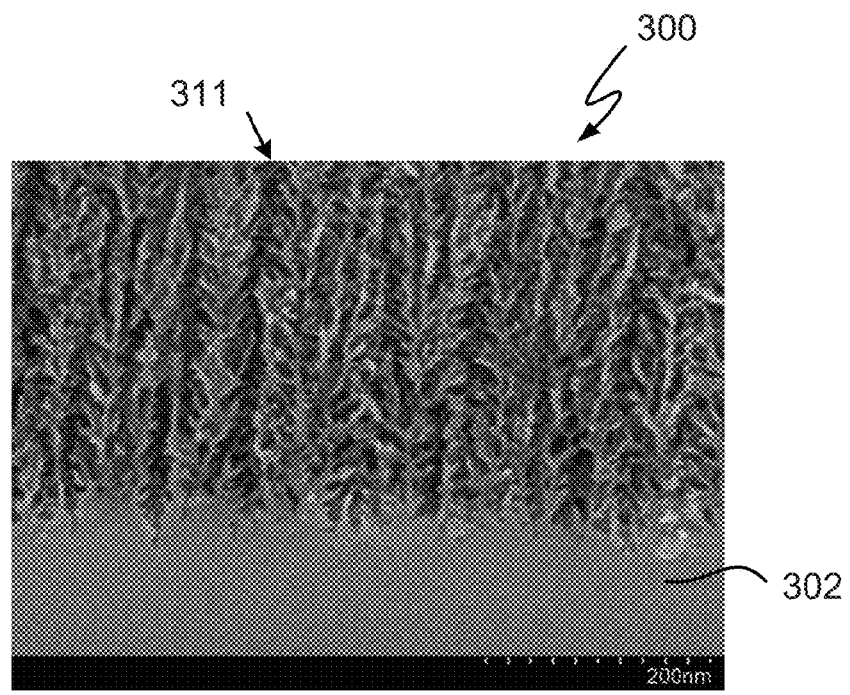
FIG. 3 is a cross-sectional side view scanning electron microscope image of a piece of porous silicon according to an embodiment of the invention.

FIG. 3 is a cross-sectional side view scanning electron microscope (SEM) image of a piece of porous silicon etched in an electrochemical etching bath according to an embodiment of the invention. As illustrated, porous structure 300 contains multiple channels 311. It should be understood that channels 311 are likely to twist and turn along their lengths such that a single channel may have both vertical and horizontal portions as well as portions that are neither completely vertical nor completely horizontal but fall somewhere in between. In the embodiment illustrated in FIG. 3, the channels extend near but do not quite reach a bottom of the etched structure, thus leaving a layer 302 of un-etched silicon underneath the channels. In one embodiment, un-etched layer 302 acts as a support structure for porous structure 300 (and for the corresponding energy storage device, not shown).

Referring again to FIGS. 1-2, energy storage device 100 may further include an electrically conductive coating 140 on at least a portion of the porous structure and in at least some of channels 111 and/or channels 121. Such an electrically conductive coating may be necessary in order to maintain or enhance the conductivity of the porous structure, or it may be helpful in reducing ESR, thereby improving performance. For example, a device having lower ESR is able to delivery higher power (which may be manifested in terms of greater acceleration, more horse power, etc.). In contrast, higher ESR (a condition that prevails inside a typical battery) limits the amount of available energy, at least partially due to the fact that much of the energy is wasted as heat. As an example, electrically conductive coating 140 may be a silicide. As another example, electrically conductive coating 140 may be a coating of metal such as, for example, aluminum, copper, and tungsten, or other electrical conductors such as tungsten nitride, titanium nitride, and tantalum nitride. Each of the listed materials has the advantage of being used in existing CMOS technology. Other metals such as nickel and calcium may also be used as electrically conductive coating 140. These materials may be applied using processes such as electroplating, chemical vapor deposition (CVD), and/or atomic layer deposition (ALD).

Also illustrated in FIGS. 1-2 is an electrolyte 150, which gives rise to the EDL. In some embodiments electrolyte 150 is organic. One type of electrolyte that may be used in accordance with embodiments of the invention is an ionic solution (liquid or solid). Another is an electrolyte (e.g., $Li_2SO_4$, $LiPF_6$) comprising an ion-containing solvent. As one example, the electrolyte can be a liquid or solid solution of organic materials such as tetraethylammonium tetrafluoroborate in acetonitrile. Other examples include solutions based on boric acid, sodium borate, or weak organic acids. Organic electrolytes and solid-state electrolytes are also possible. Electrolyte 150 (as well as other electrolytes described herein) is represented in the drawings using a random arrangement of circles. This representation is intended to convey the idea that the electrolyte is a substance (liquid or solid, including gel-like materials) containing free ions. The circles were chosen for convenience and are not intended to imply any limitation as to the components or qualities, including any limitation with respect to the size, shape, or number of the ions.

Figure 4:
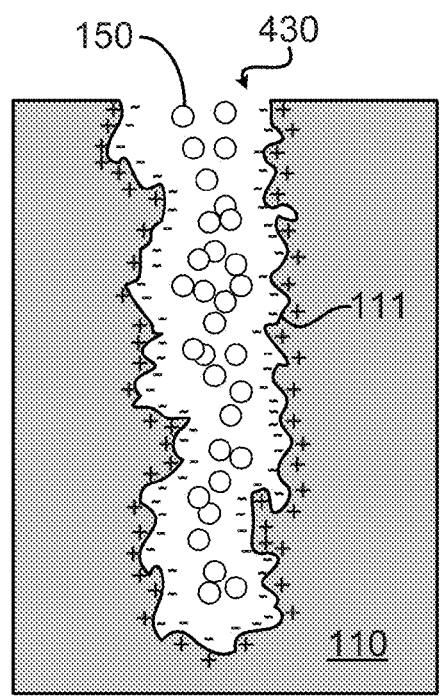
FIG. 4 is a cross-sectional side view illustration of an electric double layer within a porous structure of an energy storage device according to an embodiment of the invention.

The electric double layer is depicted schematically in FIG. 4. As illustrated in FIG. 4, an electrical double layer (EDL) 430 has been formed within one of channels 111. EDL 430 is made up of two layers of charge, one of which is the electrical charge of the sidewalls of channel 111 (depicted as being positive in FIG. 4 but which could also be negative) and the other of which is formed by free ions in the electrolyte. EDL 430 electrically insulates the surface, thus providing the charge separation necessary for the capacitor to function. The large capacitance and hence energy storage potential of EDLCs arises due to the small (approximately 1 nm) separation between electrolyte ions and the electrode surface charge.

Figure 5:
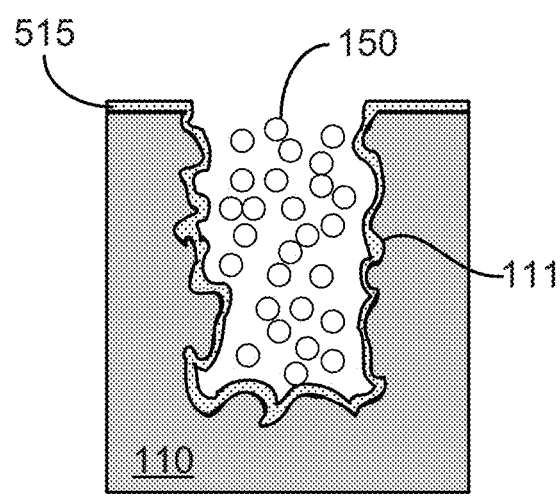
FIG. 5 is a cross-sectional side view illustration of a layer between the electrolyte and porous structure of an energy storage device according to an embodiment of the invention.

In some embodiments, a dielectric layer 515 may be placed between the electrolyte 150 and the channel 111 of the porous structure as illustrated in FIG. 5. The EDL is not shown in FIG. 5 in order to avoid unnecessarily complicating the drawing. The dielectric layer 515 may be introduced to further enhance the capacitance of the energy storage device, or for other reasons such as, but not limited to, surface passivation and wettability enhancement.

Figure 6A:
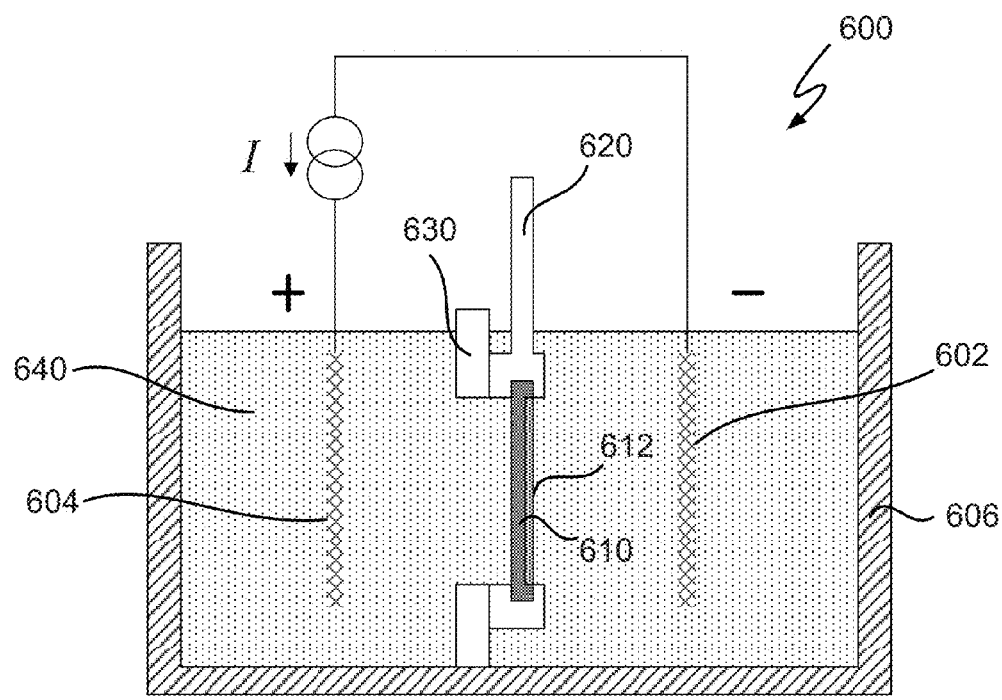
FIGS. 6A-6B are cross-sectional side view illustrations of an electrochemical etching bath according to embodiments of the invention.
Figure 6B:
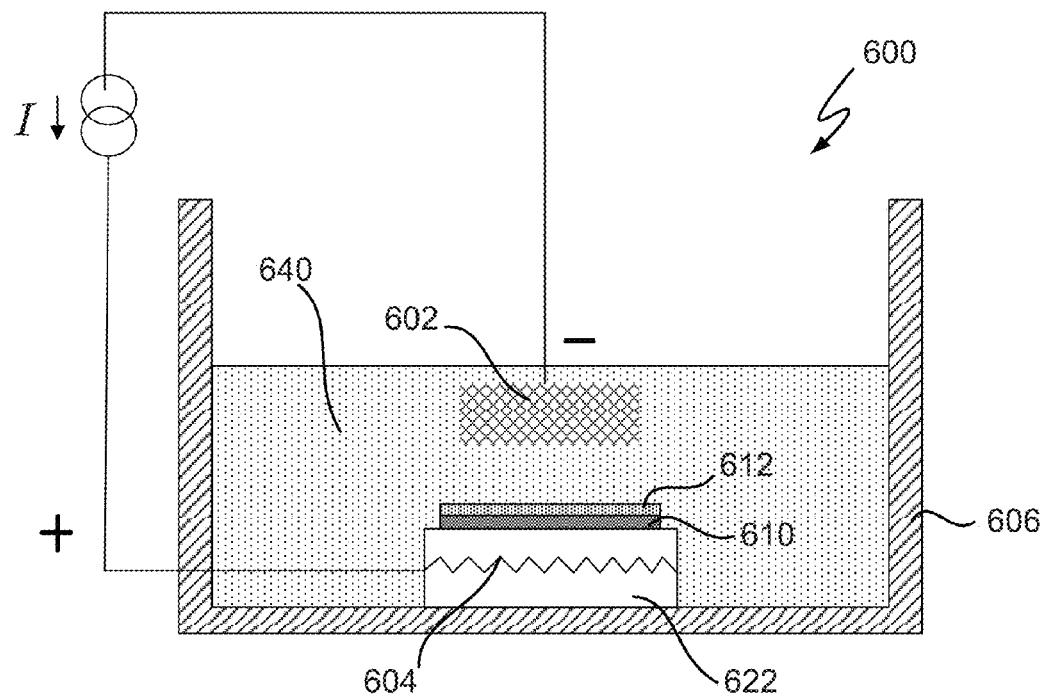

As described above, in some embodiments a porous structure can be etched into an electrically conductive substrate in an electrochemical etching bath. For example, the electrochemical etching bath may be a double cell electrochemical etching bath as illustrated in FIG. 6A, or a horizontal electrochemical etching bath as illustrated in FIG. 6B. Referring to FIG. 6A, the electrochemical etching bath 600 may include a pair of electrodes 602, 604 such as platinum net electrodes mounted into each side of the tank 606. Substrate 610 can be mounted into a removable substrate holder 620 which can be placed in front of an opening in the separation plate 630 and fixed into place with a bayonette catch. When the catch is closed, the left and right compartments are electrically isolated from each other. The electrochemical etching bath 600 may be filled with enough etching solution 640 to cover the electrically conductive substrate 610 and electrodes 602, 604. For example, where the substrate comprises silicon, exemplary etching solutions include hydrofluoric acid (HF) and HF-ethanol solutions.

Electrochemical etching a porous structure 612 into the electrically conductive substrate 610 may be performed in accordance with conventional techniques. For example, a constant current can be maintained between the negative and positive electrodes 602, 604. It may be required to vary the voltage somewhat during electrochemical etching due to loss in electrical conductivity of etching solution 640 in the etching bath 600. As illustrated, a porous structure 612 may be etched into the substrate 610 on the side of negatively charged electrode 602. Referring to FIG. 6B, a horizontal electrochemical etching bath 600 is substantially similar to that in FIG. 6A except that there is no separation plate, and the electrode 604 is embedded in the substrate holder 622 which is configured so that no etching solution 640 makes contact with the back side of the substrate 610.

Figure 7:
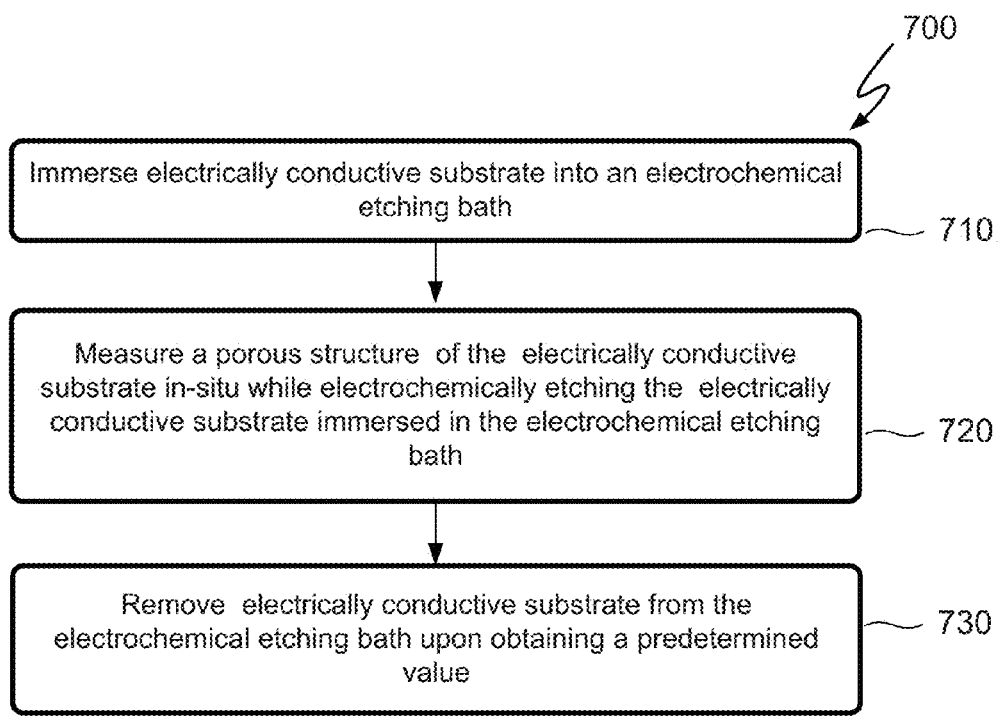
FIG. 7 is a flowchart illustrating a method of forming an energy storage device according to an embodiment of the invention.

FIG. 7 is a flowchart illustrating a method of forming an energy storage device according to an embodiment of the invention. At operation 710 an electrically conductive substrate 610 is immersed into an electrochemical etching bath 600. At operation 720 a porous structure 612 of the electrically conductive substrate 610 is measured in-situ while electrochemically etching the electrically conductive substrate 610 immersed in the electrochemical etching bath 600.

At operation 730, the electrically conductive substrate 610 is removed from the electrochemical etching bath 600 upon obtaining a predetermined value. The resultant porous structure 612 may be similar to the porous structure formed in the electrically conductive structure 110 or 120 as described above with regard to FIGS. 1-2.

Figure 8:
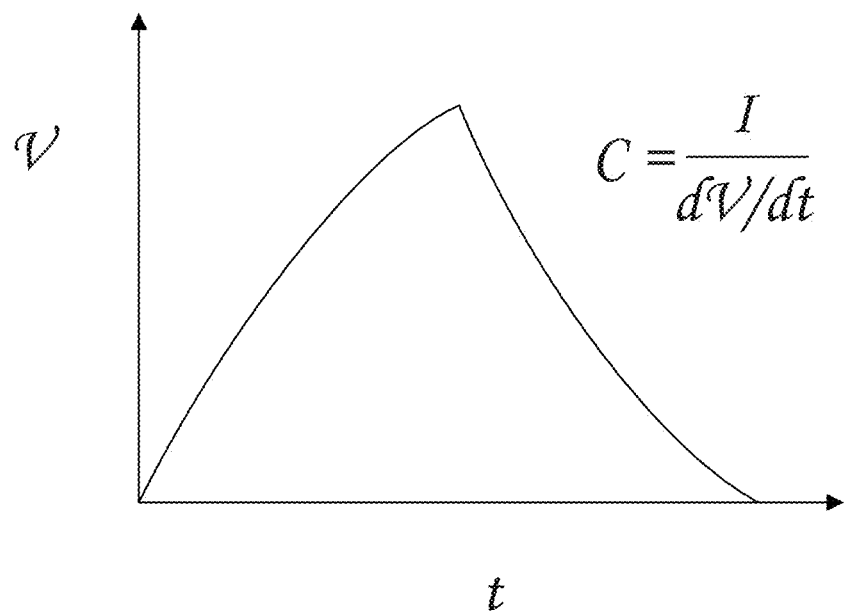
FIG. 8 is an illustration of a galvanostatic charge-discharge measurement according to an embodiment of the invention.

In one embodiment, measuring the porous structure of the electrically conductive substrate 610 corresponds to running a standard galvanostatic charge-discharge measurement in real-time during the electrochemical etching process. FIG. 8 is an illustration of such a galvanostatic charge-discharge measurement according to an embodiment of the invention. In such an embodiment, ions in the etching bath 640, such as $H^+$ and $F^-$ ions, act as a weak electrolyte. Measuring the electrical response to varying voltage across the electrodes 602, 604 in the etching bath 600 gives the double-layer capacitance at an interface of the porous structure 612 and therefore the exact surface area of the porous structure 612 that has been etched into the electrically conductive substrate 610. This measurement may be used as feedback to terminate the electrochemical etching process at a specific point corresponding to a specific surface area that has been etched, and resultant energy storage capacity of the porous structure 612.

An in-situ galvanostatic charge-discharge measurement can be performed in a variety of manners. In one embodiment, the etching current can be stopped and then the double-layer capacitance of the structure measured with a galvanostatic charge-discharge measurement. In another embodiment, the etching current across the electrically conductive substrate 610 is modulated with the current of the galvanostatic charge-discharge measurement.

In addition to measuring the porous structure of the electrically conductive structure 110 to determine a capacitance at an interface of the porous structure, other measurements may also be used. For example, optical reflection and ultrasonic reflection measurements at the porous structure can also be utilized to estimate the specific surface area that has been etched (or thickness of the porous structure 612), and the resultant energy storage capacity of the porous structure 612. Optical reflection and ultrasonic reflection measurements can likewise be performed both while the etching current is stopped or being applied across the electrically conductive substrate 610.

As described above, electrochemical etching of electrically conductive substrate 610 may correspond to electrochemical etching of electrically conductive structure 110 or 120 as described above with regard to FIGS. 1-2. In a particular embodiment, the electrically conductive structures 110 and 120 of FIG. 1 may be electrochemically etched in separate electrochemical etching baths 600, or sequentially in the same electrochemical etching baths 600 and then combined to form an energy storage device 100, such as the one illustrated in FIG. 1. In this manner, each electrically conductive structures 110 and 120 have the same energy storage capacity. Furthermore, multiple energy storage devices 100 can be stacked in series to obtain an operating voltage of n-times the working voltage of each energy storage device 100 which allows the energy storage device stack to be coupled with a silicon-based circuit without the requirement for excessive biasing circuitry.

Figure 9:
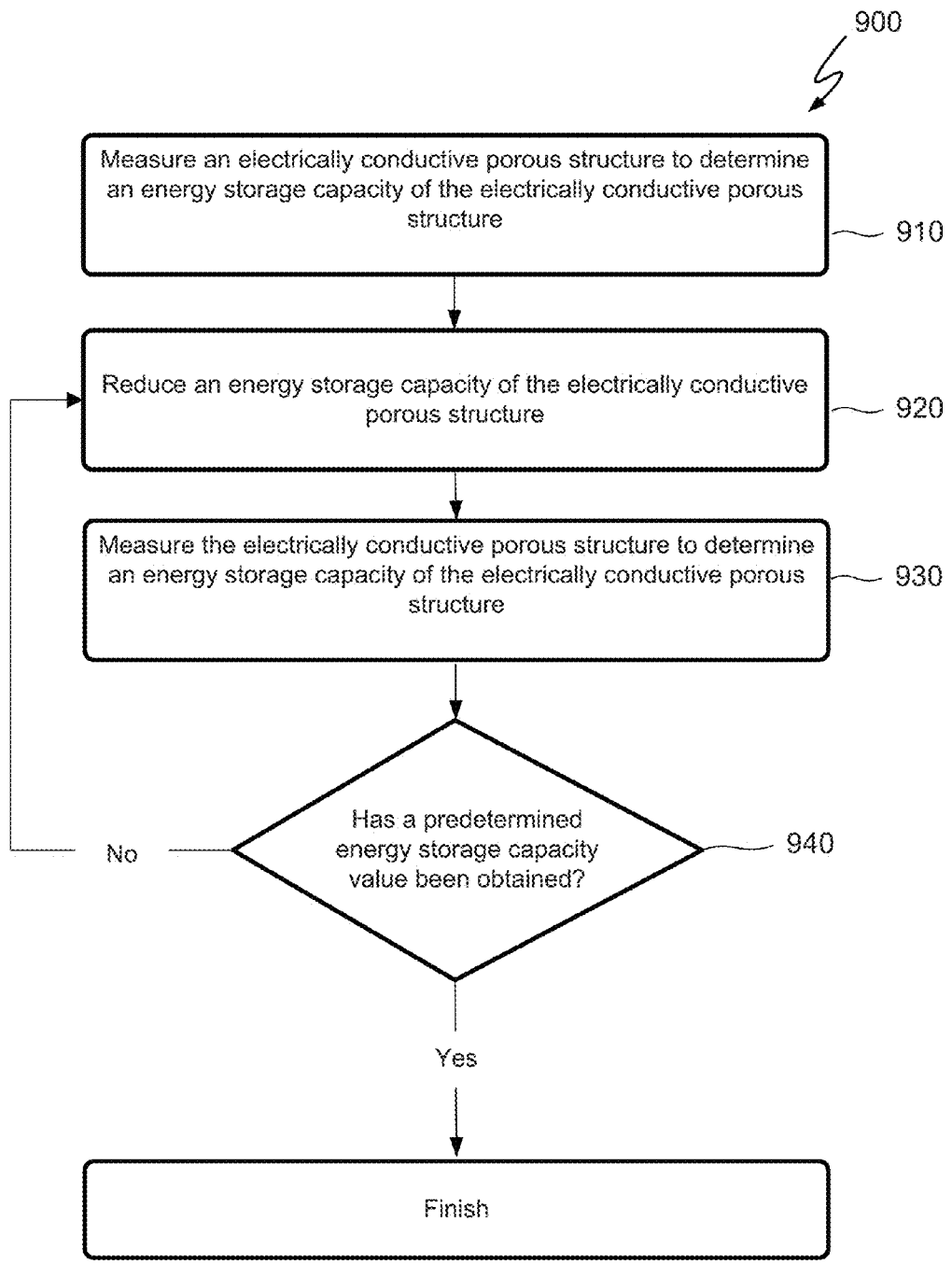
FIG. 9 is a flowchart illustrating a method of forming an energy storage device according to an embodiment of the invention.

FIG. 9. is a flowchart illustrating a method of forming an energy storage device according to an embodiment of the invention. As will become apparent in the following description, the embodiment illustrated in FIG. 9 may be particularly useful for fine-tuning the energy storage capacity in an energy storage device, or part of an energy storage device, after forming a porous structure in the electrically conductive structure. For example, the capacitance of the electrically conductive structures 110 and 120 of FIG. 1 may be adjusted after the electrochemical etching process has been completed, or alternatively after the electrically conductive structures have been integrated into an energy storage device 100, mobile electronic device (e.g. FIG. 13) or microelectronic device (e.g. FIG. 14). For exemplary purposes, the following description of FIG. 9 is made with regard to FIG. 1. However, it is to be appreciated that embodiments are not so limited and that the embodiment of FIG. 9 may be practiced with other porous structures.

At operation 910 a surface of an electrically conductive porous structure is measured to determine an energy storage capacity of the electrically conductive porous structure. The electrically conductive porous structure may be the porous structure of the electrically conductive structures 110 or 120. The surface can be measured using a variety of techniques such as, but not limited to, a galvanostatic charge-discharge measurement to determine capacitance at an interface of the porous structure, optical reflection at the porous structure, and ultrasonic reflection at the porous structure.

At operation 920 the energy storage capacity of the electrically conductive porous structure is reduced. In an embodiment, reducing the surface area comprises selective laser melting of a trim capacitor region as explained in more detail with regard to FIGS. 10A-11B. In an embodiment, reducing the surface area comprises electrically disconnecting a trim capacitor region from a bulk capacitor region, for example, by laser scribing or blowing a fuse, as explained in more detail with regard to FIGS. 12A-12B.

Upon reducing the energy storage capacity at operation 920, the electrically conductive porous structure may optionally again be measured to determine whether the energy storage capacity has been reduced to a predetermined value (or value within a range). If the energy storage value is not yet reduced to the predetermined value then operation 920 and optionally operation 930 are repeated until a predetermined energy storage capacity is obtained.

Figure 10A:
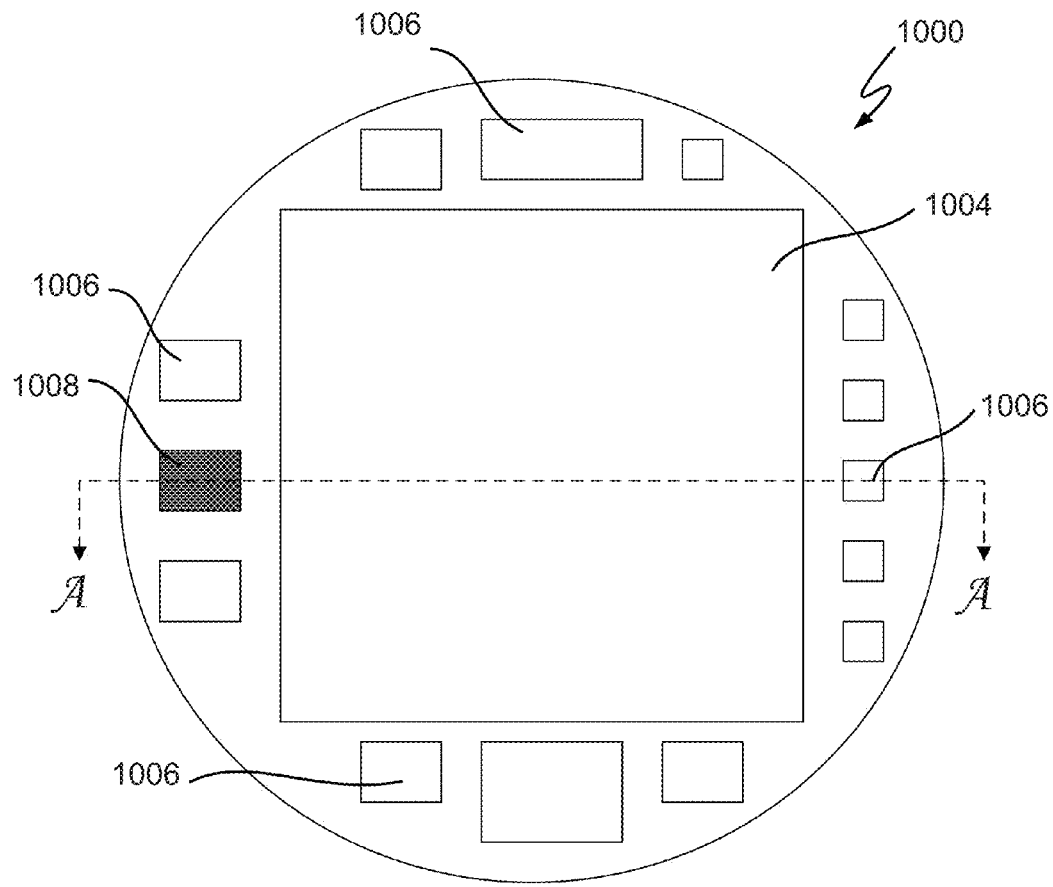
FIG. 10A is a top view illustration of an energy storage device comprising a bulk capacitor region and a fused trim capacitor region separated from the bulk capacitor region according to an embodiment of the invention.
Figure 10B:
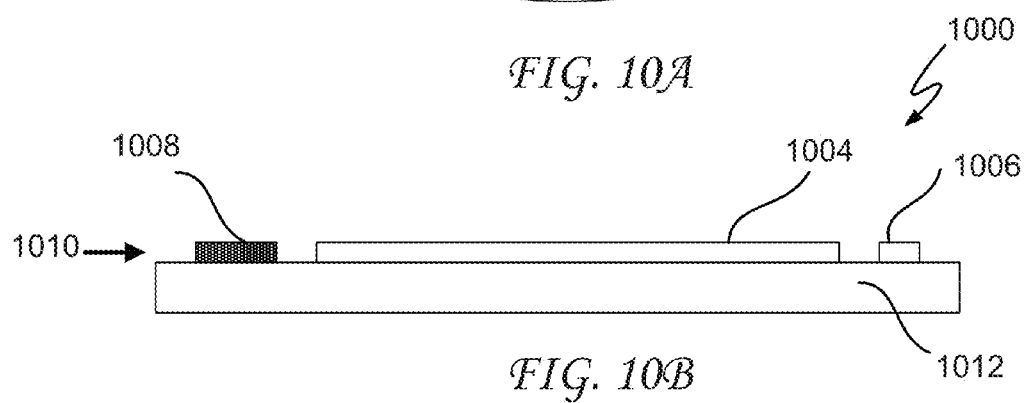
FIG. 10B is a cross-sectional side view illustration along line A-A in FIG. 10A according to an embodiment of the invention.

FIG. 10A is a top view illustration of an energy storage device comprising a bulk capacitor region and a fused trim capacitor region separated from the bulk capacitor region according to an embodiment of the invention, and FIG. 10B is a cross-sectional side view illustration along line A-A in FIG. 10A according to an embodiment of the invention. As illustrated, an energy storage device 1000 may include an electrically conductive porous structure 1010 including a bulk capacitor region 1004 having a bulk surface area, and an array of trim capacitor regions 1006 separated from the bulk capacitor region 1004. The array of trim capacitor regions 1006 can be separated from the bulk capacitor region 1004 using standard lithographic techniques. The array of trim capacitor regions 1006 may have a variety of different surface areas, for example, which can correspond to porosity density or size (e.g. a width in the top view illustration of FIG. 10A) of the trim capacitor regions 1006 relative to the bulk capacitor region 1004. In operation, the total energy storage capacity of the energy storage device 1000 is related to the sum of the surface areas of the bulk capacitor region 1004 and trim capacitor regions 1006. As described with regard to FIG. 9, the total energy storage capacity of the energy storage device 1000 can be reduced by selective laser melting of a trim capacitor region, represented as trim capacitor region 1008 in FIGS. 10A-10B. Since the array of trim capacitor regions 1006 comprise a variety of different surface areas, a particular trim capacitor region 1006 corresponding to a specific surface area can be chosen for selective laser melting based on the desired amount of reduction in storage energy capacity.

In an embodiment, the electrically conductive porous structure may be the electrically conductive structure 110 or 120 of FIG. 1 which includes multiple channels 111, 121 with each of the channels having an opening 112, 122 to a surface 115, 125 of the electrically conductive structure 110 or 120. In such an embodiment fusing of the trim capacitor region 1008 by selective laser melting melts the porous structure including the multiple channels so that the openings 112, 122 are fused, thereby reducing the surface area of the fused trim capacitor 1008 and overall energy storage capacity of the electrically conductive porous structure and energy storage device 1000.

In an embodiment, the electrically conductive porous structure 1010 may be formed on an electrically conductive layer 1012 such as, but not limited to, a metal film. In another embodiment, the electrically conductive porous structure 1010 may be formed in an upper surface of a non-porous bulk material, such as the non-porous silicon 302 illustrated in FIG. 3.

Figure 11A:
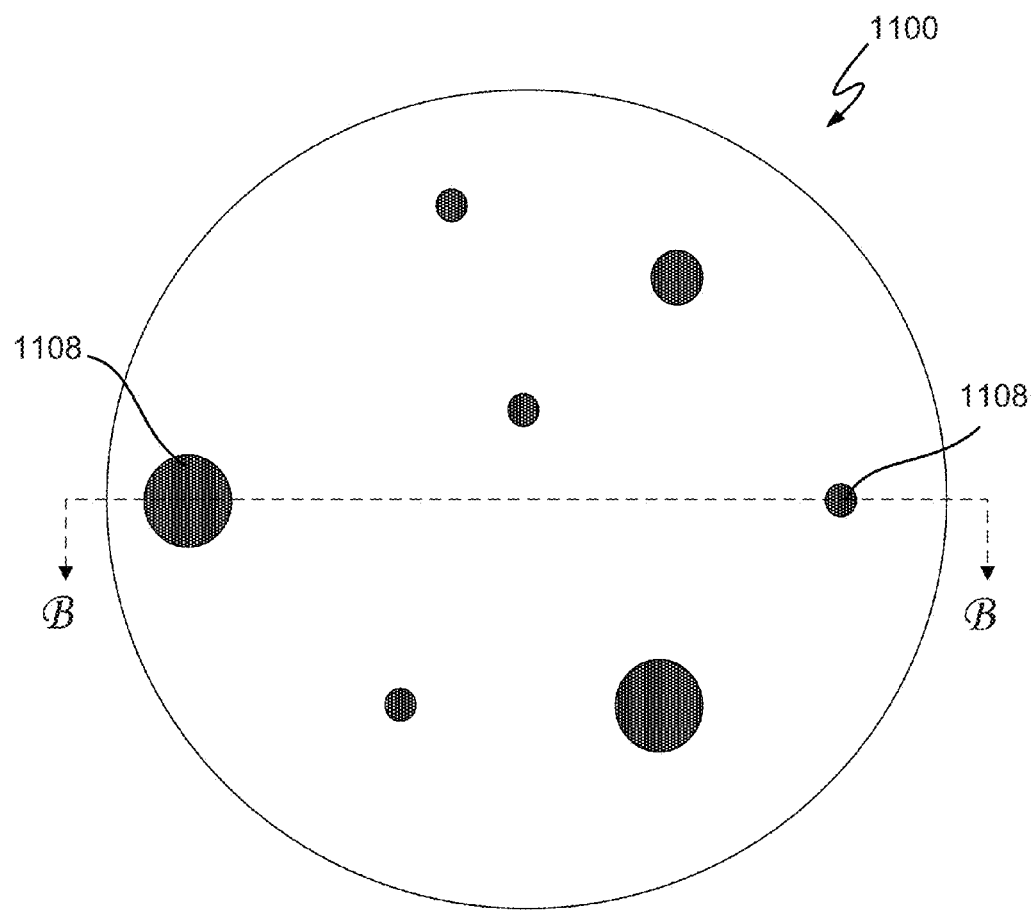
FIG. 11A is a top view illustration of an energy storage device comprising a bulk capacitor region and a fused trim capacitor region according to an embodiment of the invention.
Figure 11B:
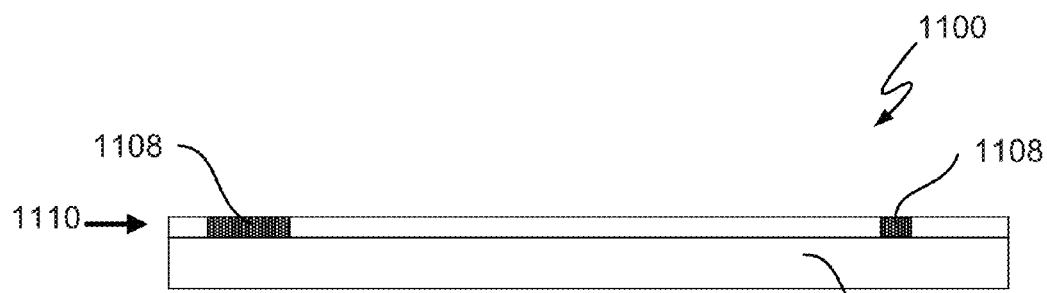
FIG. 11B is a cross-sectional side view illustration along line B-B in FIG. 11A according to an embodiment of the invention.

FIG. 11A is a top view illustration of an energy storage device comprising a bulk capacitor region and a fused trim capacitor region according to an embodiment of the invention, and FIG. 11B is a cross-sectional side view illustration along line B-B in FIG. 11A according to an embodiment of the invention. Unlike the energy storage device 1000 of FIGS. 10A-10B, the energy storage device 1100 of FIGS. 11A-11B does not include an array of trim capacitor regions 1006 which have been separated from a bulk capacitor region 1004. Rather, the total energy storage capacity of the energy storage device 1100 can be reduced by selective laser melting various locations of the conductive porous structure 1110. Since the desired amount of reduction in storage energy capacity is related to surface area, the total amount of surface area reduction can be accomplished by varying the number of locations for selective laser melting or the size (e.g. a width in the top view illustration of FIG. 11A) of the laser used to form fused trim capacitor regions 1108. In an embodiment, the electrically conductive porous structure 1110 may be formed on an electrically conductive layer 1112 such as, but not limited to, a metal film. In another embodiment, the electrically conductive porous structure 1110 may be formed in an upper surface of a non-porous bulk material, such as the non-porous silicon 302 illustrated in FIG. 3.

Figure 12A:
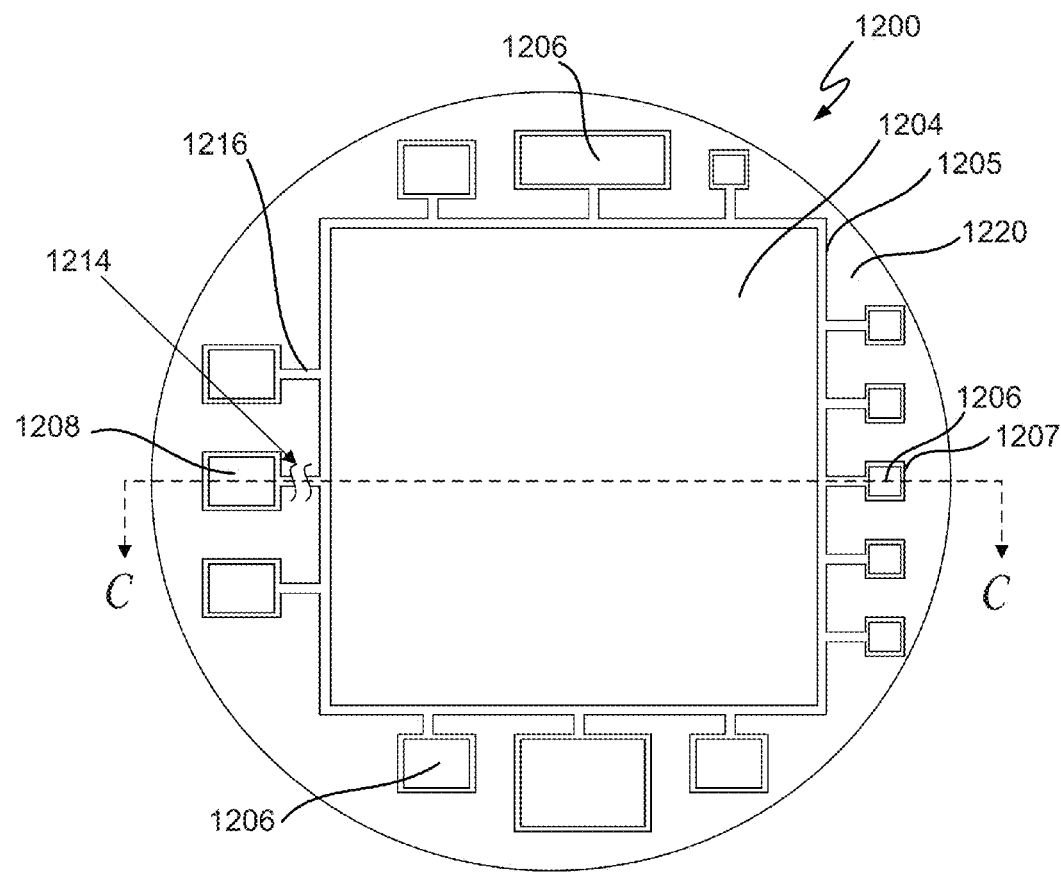
FIG. 12A is a top view illustration of an energy storage device comprising a bulk capacitor region and a trim capacitor region electrically disconnected from the bulk capacitor region according to an embodiment of the invention.
Figure 12B:
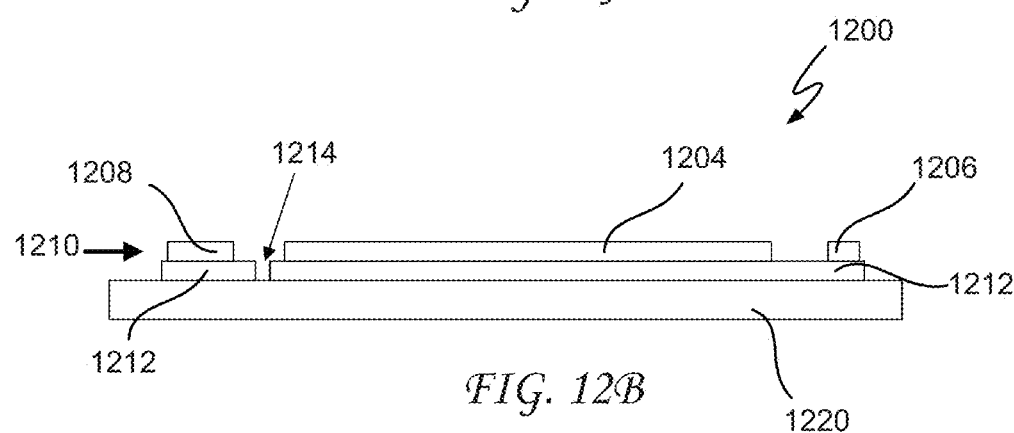
FIG. 12B is a cross-sectional side view illustration along line C-C in FIG. 12A according to an embodiment of the invention.

FIG. 12A is a top view illustration of an energy storage device comprising a bulk capacitor region and a trim capacitor region electrically disconnected from the bulk capacitor region according to an embodiment of the invention, and FIG. 12B is a cross-sectional side view illustration along line C-C in FIG. 12A according to an embodiment of the invention. Like the energy storage device 1000 of FIGS. 10A-10B, the electrically conductive porous structure 1210 of energy storage device 1200 of FIGS. 12A-12B includes an array of trim capacitor regions 1206 separated from a bulk capacitor region 1204. In an embodiment, the electrically conductive porous structure 1210 is formed on a patterned electrically conductive layer 1212. In an embodiment, the electrically conductive porous structure 1210 may be formed on an electrically conductive layer 1212 such as, but not limited to, a metal film. In another embodiment, the electrically conductive porous structure 1210 may be formed in an upper surface of a non-porous bulk material, such as the non-porous silicon 302 illustrated in FIG. 3.

Referring to FIG. 12A, the electrically conductive layer 1212 is patterned to include a bulk pad 1205 below the bulk capacitor region 1204, and an array of pads 1207 below the array of trim capacitor regions 1206, and a plurality of traces 1216 connecting the array of pads 1207 to the bulk pad 1205.

As described with regard to FIG. 9, the total energy storage capacity of the energy storage device 1000 can be reduced by electrically disconnecting a trim capacitor region 1208 from a bulk capacitor region as illustrated by the disconnect 1214 in trace 1216. In an embodiment, this is accomplished by laser scribing trace 1216. In another embodiment, this is accomplished by blowing a fuse in electrical connection with conductive pad 1207 coupled with trim capacitor region 1206. In an embodiment, a support layer 1220 may be provided to support the disconnectable structure.

Figure 13:
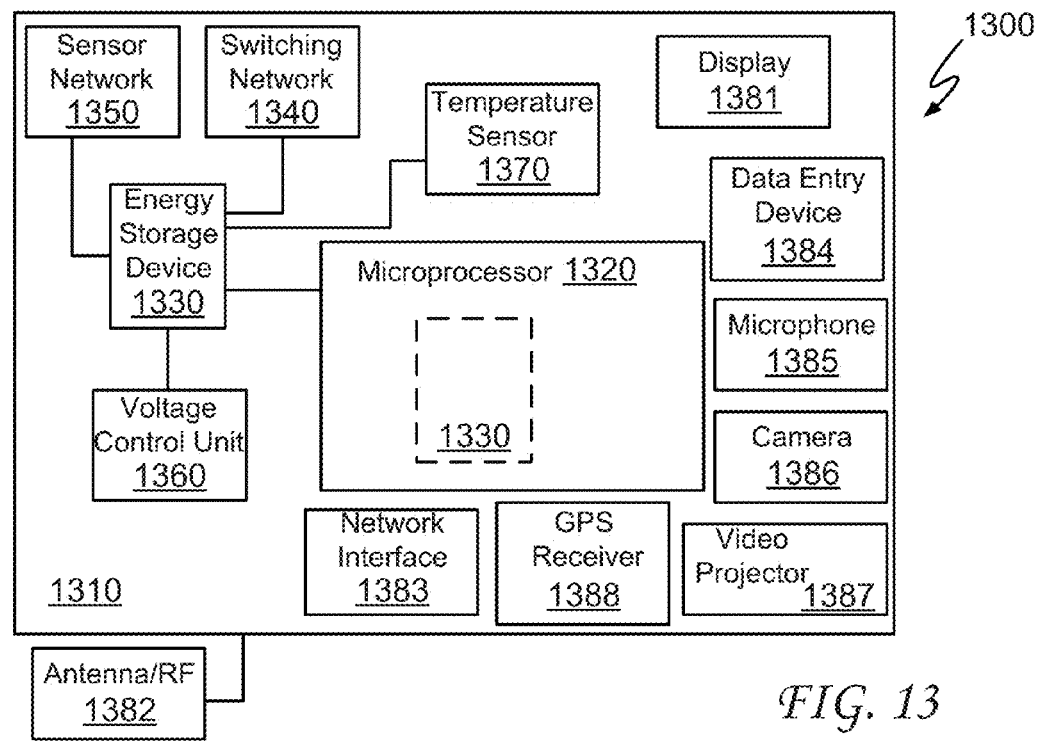
FIG. 13 is a block diagram illustration of a mobile electronic device according to an embodiment of the invention.

FIG. 13 is a block diagram representing a mobile electronic device 1300 according to an embodiment of the invention. As illustrated in FIG. 13, mobile electronic device 1300 comprises a substrate 1310 on which a microprocessor 1320 and an energy storage device 1330 associated with microprocessor 1320 are disposed. Energy storage device 1330 can either be located on substrate 1310 away from microprocessor 1320, as illustrated in solid lines, or it can be located on microprocessor 1320 itself, as illustrated in dashed lines. In one embodiment energy storage device 1330 comprises first and second electrically conductive structures separated from each other by a separator, where at least one of the first and second electrically conductive structures comprises a porous structure containing multiple channels. As an example, this embodiment can be similar to one or more of the embodiments shown in FIGS. 1-5 and described in the accompanying text. In another embodiment, energy storage device 1330 comprises a plurality of electrically conductive structures comprising porous structures stacked in series. In another embodiment, energy storage device 1330 includes a porous structure including a bulk capacitor region and at least one trim capacitor region. In an embodiment, the surface area of the porous structure is reduced in the trim capacitor region with a laser scribe, blown fuse, or fused opening.

In at least some embodiments energy storage device 1330 is one of a plurality of energy storage devices, which may be stacked in series, (all of which are represented in FIG. 13 by block 1330) contained within mobile electronic device 1300. In one or more of those embodiments mobile electronic device 1300 further comprises a switching network 1340 associated with the energy storage devices. When a capacitor is being discharged it doesn't maintain a constant voltage but instead decays in an exponential manner (unlike a battery where the voltage stays relatively constant during discharge). Switching network 1340 comprises circuitry or some other mechanism that switches in and out various capacitors such that a relatively constant voltage is maintained. For example, the energy storage devices could initially be connected to each other in parallel and then, after a certain amount of voltage decay, a subset of the energy storage devices could be changed by the switching network so as to be connected in series such that their individual voltage contributions can boost the declining overall voltage. In one embodiment switching network 1340 could be implemented using existing silicon device technology as used in the art (transistors, silicon controlled rectifiers (SCRs), etc.), while in other embodiments it could be implemented using micro-electromechanical systems (MEMS) relays or switches (which, it may be noted, tend to have very low resistance).

In some embodiments mobile electronic device 1300 further comprises a sensor network 1350 associated with energy storage devices 1330. In at least some embodiments each one of the plurality of energy storage devices will have its own sensor that indicates certain behavioral parameters of the energy storage device. For example, the sensors may indicate existing voltage levels as well as the ongoing discharge response, both of which are parameters that may be used by the switching network—especially in cases where the dielectric material (or other electrical insulator) being used is not linear but rather has a dielectric constant that varies with the voltage. In those cases, it may be advantageous to include along with the sensor network a finite state machine such as a voltage control unit 1360 that knows what the behavior of the dielectric is and responds accordingly. A voltage control unit that knows how the dielectric behaves can compensate for any non-linearity. A temperature sensor 1370 associated with energy storage devices 1330 may also be included in order to sense temperature (or other safety-related parameters). In certain embodiments of the invention, mobile electronic device 1300 further comprises one or more of: a display 1381, antenna/RF elements 1382, a network interface 1383, a data entry device 1384 (e.g., a keypad or a touchscreen), a microphone 1385, a camera 1386, a video projector 1387, a global positioning system (GPS) receiver 1388, and the like.

Figure 14:
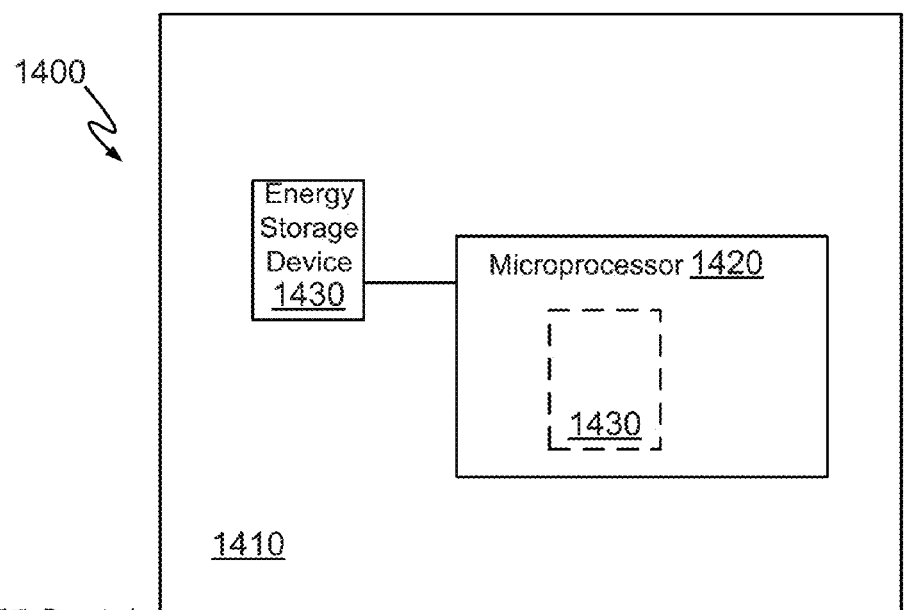
FIG. 14 is a block diagram illustration of a microelectronic device according to an embodiment of the invention.

FIG. 14 is a block diagram representing a microelectronic device 1400 according to an embodiment of the invention. As illustrated in FIG. 14, microelectronic device 1400 comprises a substrate 1410, a microprocessor 1420 over substrate 1410, and an energy storage device 1430 associated with microprocessor 1420. Energy storage device 1430 can either be located on substrate 1410 away from microprocessor 1420 (e.g., a die-side capacitor), as illustrated in solid lines, or it can be located on microprocessor 1420 itself (e.g., in a build-up layer above the microprocessor), as illustrated in dashed lines. In one embodiment, energy storage device 1430 comprises first and second electrically conductive structures separated from each other by a separator, where at least one of the first and second electrically conductive structures comprises a porous structure. As an example, this embodiment can be similar to one or more of the embodiments shown in FIGS. 1-5 and described in the accompanying text. In another embodiment, energy storage device 1430 comprises a plurality of electrically conductive structures comprising porous structures stacked in series. In another embodiment, energy storage device 1430 includes a porous structure including a bulk capacitor region and at least one trim capacitor region. In an embodiment, the surface area of the porous structure is reduced in the trim capacitor region with a laser scribe, blown fuse, or fused opening.

The energy storage devices disclosed herein may in some embodiments be used as a decoupling capacitor within microelectronic device 1400—one that is smaller and that, for the reasons described elsewhere herein, offers much higher capacitance and much lower impedance than existing decoupling capacitors. As already mentioned, energy storage device 1430 can be part of a support integrated circuit (IC) or chip or it can be located on the microprocessor die itself. As an example, one might, according to embodiments of the invention, be able to form regions of porous silicon (or the like, as described above) on a microprocessor die and then create a high-surface-area embedded decoupling capacitor right on the substrate of the microprocessor die. Because of the porosity of the silicon, the embedded capacitor would have very high surface area. Other possible uses for the disclosed energy storage devices include use as a memory storage element (where problems with the z-direction size of embedded DRAM approaches may be solved by greatly increasing the farads per unit area) or as a component of voltage converters in voltage boost circuitry, perhaps for use with circuit blocks, individual microprocessor cores, or the like.

As an example, higher capacitance values could in this context be advantageous because parts of the circuit could then run nominally at a certain (relatively low) voltage but then in places where higher voltage is needed in order to increase speed (e.g., cache memory, input/output (I/O) applications) the voltage could be boosted to a higher value. An operational scheme of this sort would likely be preferred over one in which the higher voltage is used everywhere; i.e., in cases where only a small amount of circuitry requires a higher voltage it likely would be preferable to boost voltage from a lower baseline voltage for that small portion of the circuit rather than drop voltage from a higher baseline value for the majority of the circuitry. Future microprocessor generations may also make use of voltage converters of the type described here. Having more capacitance available to be deployed around a package or around a microprocessor die may help solve the existing issue of intolerably high inductance between transistors that transfer voltage around a circuit.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage devices and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An energy storage device comprising:
   an electrically conductive porous structure;
   wherein the electrically conductive porous structure includes a bulk capacitor region having a bulk surface area, and an array of trim capacitor regions separated from the bulk capacitor region, the array of trim capacitor regions including a plurality of different surface areas,
   wherein the bulk capacitor region contains multiple channels and wherein each of the channels has an opening to a surface of the electrically conductive porous structure.

2. The energy storage device of claim 1, wherein the electrically conductive porous structure is formed on a metal layer, wherein the metal layer comprises a bulk pad below the bulk capacitor region, an array of pads below the array of trim capacitor regions, and a plurality of traces connecting the array of pads to the bulk pad.

3. The energy storage device of claim 1, further comprising a fuse electrically connected to at least one of the trim capacitor regions.

4. The energy storage device of claim 1, wherein the energy storage device is packaged within an electronic device and is associated with a microprocessor.

5. An energy storage device comprising:
   an electrically conductive porous structure;
   wherein the electrically conductive porous structure comprises a bulk capacitor region having a bulk unit surface area, and at least one trim capacitor region in which the conductive porous structure is fused and has a reduced unit surface area,
   wherein the bulk capacitor region contains multiple channels wherein each of the channels has an opening to a surface of the electrically conductive porous structure.

6. The energy storage device of claim 5, wherein the trim capacitor region comprises a fused channel opening.

7. The energy storage device of claim 5, further comprising a plurality of trim capacitor regions.

8. The energy storage device of claim 5, further comprising a plurality of trim capacitor regions having a plurality of different widths spanning a surface of the electrically conductive porous structure.

9. The energy storage device of claim 5, wherein the energy storage device is packaged within an electronic device and is associated with a microprocessor.

* * * * *